(12) United States Patent
Zimmer et al.

(10) Patent No.: US 8,511,035 B2
(45) Date of Patent: Aug. 20, 2013

(54) ANCHOR FOR MOUNTING IN COVER PANELS

(76) Inventors: Günther Zimmer, Rheinau (DE); Martin Zimmer, Rheinau (DE)

( * ) Notice: Subject to any disclaimer, the term of this patent is extended or adjusted under 35 U.S.C. 154(b) by 0 days.

(21) Appl. No.: 12/386,571

(22) Filed: Apr. 20, 2009

(65) Prior Publication Data

US 2011/0083397 A1   Apr. 14, 2011

Related U.S. Application Data (63) Continuation-in-part of application No. PCT/DE2007/001868, filed on Oct. 19, 2007.

(30) Foreign Application Priority Data

Oct. 19, 2006   (DE) .......................... 10 2006 049 954

(51) Int. Cl.
*E04B 1/38* (2006.01)

(52) U.S. Cl.
USPC ................. 52/699; 52/787.1; 411/32; 411/44

(58) Field of Classification Search
USPC ..................... 52/699, 364, 787.1; 411/32, 43, 411/44, 45, 46, 47, 48, 57.1, 58, 60.1
See application file for complete search history.

(56) References Cited

U.S. PATENT DOCUMENTS

| | | | | |
|---|---|---|---|---|
| 688,756 A * | 12/1901 | Tripp | ............................... | 411/50 |
| 1,000,715 A * | 8/1911 | Caywood | ..................... | 411/57.1 |
| 3,042,156 A * | 7/1962 | Rohe | ........................... | 52/787.12 |
| 3,216,305 A * | 11/1965 | Kaplan et al. | ................... | 411/58 |
| 3,266,364 A * | 8/1966 | Becker | ............................. | 411/44 |
| 3,651,563 A * | 3/1972 | Volkmann | ....................... | 29/523 |
| 4,428,705 A * | 1/1984 | Gelhard | ........................ | 411/82.1 |
| 4,514,125 A * | 4/1985 | Stol | ............................... | 411/82.3 |
| 4,653,132 A * | 3/1987 | Yamada | .......................... | 470/14 |
| 4,690,597 A * | 9/1987 | Liebig | ............................ | 411/32 |
| 4,781,501 A * | 11/1988 | Jeal et al. | ........................ | 411/43 |
| 4,789,284 A * | 12/1988 | White | ............................. | 411/50 |
| 4,820,095 A * | 4/1989 | Mraz | .......................... | 411/82.3 |
| 4,973,207 A * | 11/1990 | Mayer | ............................ | 411/32 |
| 5,256,016 A * | 10/1993 | Godfrey | ........................... | 411/32 |
| 5,261,772 A * | 11/1993 | Henninger et al. | ............. | 411/46 |
| 5,575,600 A * | 11/1996 | Giannuzzi et al. | ............. | 411/48 |
| 5,725,341 A * | 3/1998 | Hofmeister | ...................... | 411/32 |
| 5,980,174 A * | 11/1999 | Gallagher et al. | ............. | 411/55 |

(Continued)

FOREIGN PATENT DOCUMENTS

GB   2 073 838 A   4/1980

*Primary Examiner* — Joshua J Michener
*Assistant Examiner* — James Ference
(74) *Attorney, Agent, or Firm* — Klaus J. Bach (57) ABSTRACT

In an anchor for the attachment to flat building components including two cover plates and an intermediate support core layer wherein the anchor comprises an expansion body and a wedge body which is inserted into the expansion body and includes an opening for inserting a mounting means, the installed anchor is disposed in an opening of the component which extends through the cover plates and the intermediate support core plate. The expansion body has spreadable engagement elements, wherein, with the anchor installed, a cylinder zone is in contact with the bore wall of the first cover plate, and a wedging zone spreads out engagement elements behind the first cover plate. A part of the anchor is additionally disposed in the second cover plate.

12 Claims, 7 Drawing Sheets

(56) References Cited

U.S. PATENT DOCUMENTS

| | | | |
|---|---|---|---|
| 6,039,523 A * | 3/2000 | Kraus | 411/48 |
| 6,048,148 A * | 4/2000 | Gassner et al. | 411/54.1 |
| 6,293,743 B1 * | 9/2001 | Ernst et al. | 411/24 |
| 6,468,010 B2 * | 10/2002 | Sager et al. | 411/82 |
| 6,702,534 B2 * | 3/2004 | Filipp | 411/58 |
| 6,827,536 B1 * | 12/2004 | Leon et al. | 411/61 |
| 6,874,984 B2 * | 4/2005 | Lin et al. | 411/57.1 |
| 7,413,367 B2 * | 8/2008 | Hawang | 403/297 |
| 2002/0127081 A1 * | 9/2002 | Filipp | 411/58 |
| 2004/0253075 A1 * | 12/2004 | Liebig et al. | 411/57.1 |
| 2009/0272065 A1 * | 11/2009 | Zimmer et al. | 52/699 |
| 2009/0274533 A1 * | 11/2009 | Zimmer et al. | 411/49 |
| 2009/0274534 A1 * | 11/2009 | Zimmer et al. | 411/57.1 |
| 2010/0115882 A1 * | 5/2010 | Seroiszka et al. | 52/787.1 |

* cited by examiner

ANCHOR FOR MOUNTING IN COVER PANELS

This is a continuation-in-part application of pending international patent application PCT/DE2007/001868 filed Oct. 19, 2007 and claiming the priority of German patent application 10 2006 049 954.9 filed Oct. 19, 1916.

BACKGROUND OF THE INVENTION

The invention resides in an anchor for mounting in a planar building component having first and second cover plates with an intermediate support plate, wherein the anchor includes at least a spreading body and at least one wedge body and wherein the wedge body, which is at least partially inserted into the spreading body, includes a cavity for threading or punching a mounting member into the anchor.

Flat construction components are often designated as sandwich panels, honeycomb panels or light weight construction panels. All panel types used in furniture construction comprise generally cover layers of thin particle boards, medium or high density fiber boards, plywood or hard fiber boards. The sandwich panels often have an intermediate support structure comprising corrugated web inserts or so-called expanded honeycombs. Most lightweight construction panels have a raw density below 500 kg/m$^3$. If as intermediate layers no fire resistant foamed aluminum or foamed glass is used, the raw density is below 350 kg/m$^3$. For comparison, the raw density of a normal particle board is about 600 to 750 kg/m$^3$.

If fixtures are to be attached to light-weight panels for example, by screws, the problem arises that the attachment means find support only in the relatively thin cover layers or cover plates. Typical solutions in such cases are spreading anchors as they are disclosed in the printed publication DE 20 204 000 474 V1. The spreading anchors however have the disadvantage that they engage the upper plate in the front and the back side over a large area. The rear engagement additionally displaces the support core material over a large area around the bore, whereby the cover plate is more easily detached from the support core material and is lifted off if the anchor is subjected to high tension forces.

Another anchor which avoids this disadvantage is known from the internet catalog (September 2006) of the company Fischer Befestigungssysteme GmbH. It is listed there under the designation SIAM-N. The anchor has a tubular spreading body, into whose bore an at least sectionally truncated cone-shaped wedge body is inserted at the rear slotted expansion body end. The wedge body has a central bore with an internal thread. If the wedge body is moved into the expansion body for example by tightening of a retaining screw which is disposed in the thread of the wedge body, the expansion body is expanded and clamped, that is, engaged in the lower area of the bore. However, this anchor would require a very rigid core material to be firmly engaged therein.

It is the object of the present invention to provide an anchor for lightweight construction panels which is easy to install and which is safely and durably engaged in the lightweight construction panel.

SUMMARY OF THE INVENTION

In an anchor for the attachment to flat building components including two cover plates and an intermediate support core layer wherein the anchor comprises an expansion body and a wedge body which is inserted into the expansion body and includes an opening for inserting a mounting means, the installed anchor is disposed in an opening of the component which extends through the cover plates and the intermediate support core plate. The expansion body has spreadable engagement elements, wherein, with the anchor installed, a cylinder zone is in contact with the bore wall of the first cover plate, and a wedging zone spreads out engagement elements behind the first cover plate. A part of the anchor is additionally disposed in the second cover plate.

The installed anchor is disposed in an opening of the building component which extends through the first cover plate and the intermediate support core layer and as dead end bore partially into the second cover plate. The expansion body has at least two spreadable engagement elements, a locking zone and a support zone. The wedge body comprises at least one cylinder zone, at least one wedging zone and at least one locking zone. With the anchor installed, one cylinder zone is in contact with the bore wall of the first cover plate, a wedging zone spreads the engagement elements of the expansion body behind the first cover plate so that they abut the first cover plate and the locking zones are interlocked and the support zone of the expansion body is disposed in the dead end bore of the second cover plate axially and radially in contact therewith.

Alternatively, the installed anchor is disposed in an opening of the component which extends through the first cover plate and the intermediate support layer. The expansion body includes at least two expandable engagement elements, one locking zone and a chamber with a cement material cartridge which includes at least one cement material and which has discharge bores at both sides thereof. The wedging body has at least one cylinder zone, at least one wedge zone, at least one locking zone and a piston-like end. With the anchor installed, the cylinder zone is arranged in the bore adjacent the cover plate, a spreading zone spreads the engagement elements of the expansion body behind the first cover plate abutting the cover plate—the locking zones are interconnected, the bottom end of the expansion body abuts the second cover plate and the cement of the opened cement cartridge is spread out between the lower cover plate and the bottom end of the expansion body.

Locking between the expansion body and the wedge body may be omitted.

With the present invention, an anchor for lightweight building plates is provided which has a high retaining force and can be rapidly installed manually as well as by a machine.

The invention will become more readily apparent from the following description of schematically shown embodiments.

BRIEF DESCRIPTION OF THE DRAWINGS

It is shown in.

DESCRIPTION OF PARTICULAR EMBODIMENTS

Figure 1:
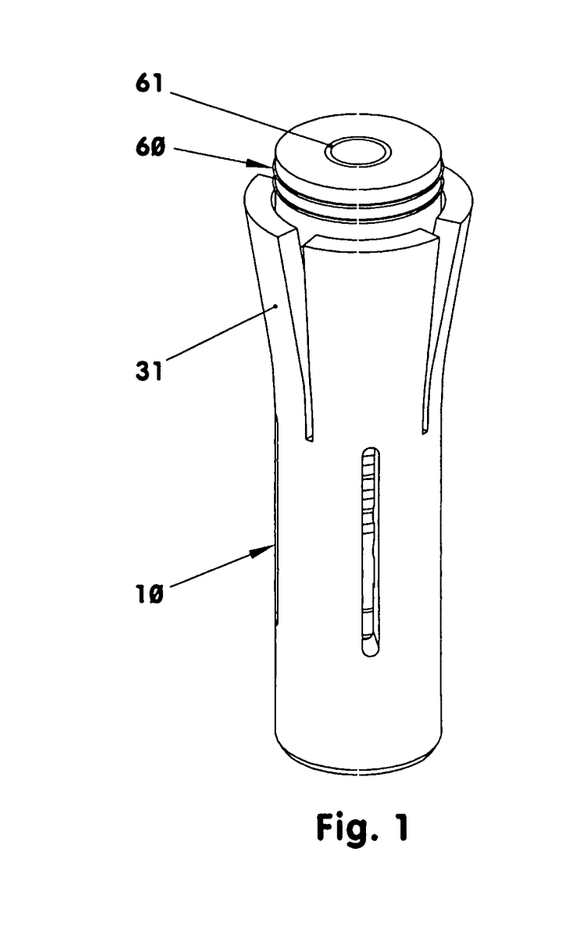
FIG. 1: A perspective representation of an expansion anchor.

FIG. 1 shows a spread anchor in the form which it would have after installation in a lightweight construction panel. In this embodiment, the anchor has only two parts, an expansion body (10) and a wedge body (60). Both parts (10, 60) are shown separately in FIGS. 2 and 3. The anchor according to FIG. 1 has for example a length of 35 mm. The opening drilled for mounting the anchor has for example a diameter of 8.5 mm. The diameter of the unexpanded anchor is in this design either maximally three times the core diameter of the screw to be installed via the anchor in the lightweight building plate or, maximally 2.3 times the actual diameter of the screw when threaded into the anchor.

Figure 12:
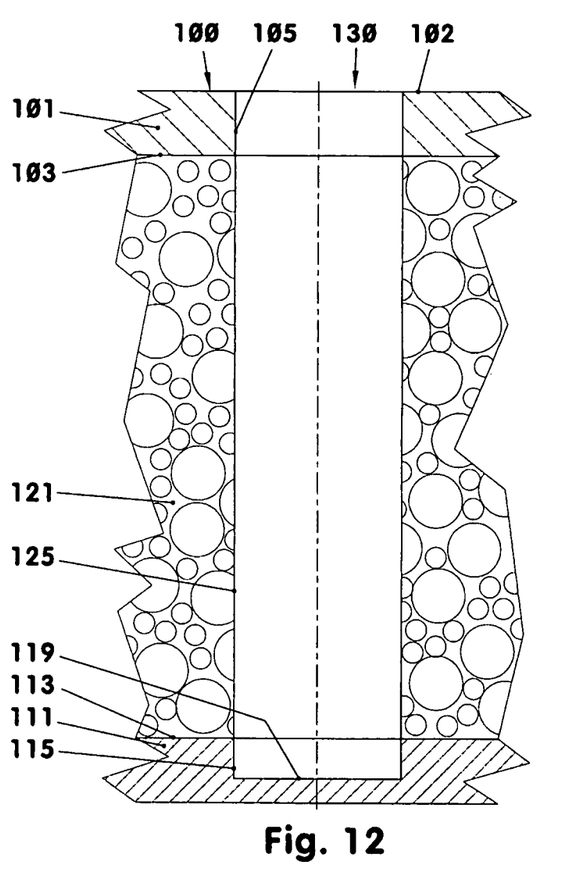
FIG. 12: A representation of the lightweight construction panel bore.

The anchor is provided for example for the mounting of fixtures to light-weight construction panels (100) without walers and solid inserts, see FIG. 12. The shown lightweight building panel (100) comprises two cover plates (101, 111) and an intermediate support core (121). Each cover plate (101, 111) consists in the shown embodiment of a thin particle board. The support core (121) is for example a PU foam core. The cover plates (101, 111) are glued with their inner surfaces (103, 113) to the plate-shaped support core (121). The lightweight building panel has a wall thickness of 37.5 mm. Instead of a foam core, a honeycomb core structure may be provided. The lightweight construction panel includes a bore (130) which comprises the sections (105), (125), and (115). The latter section (115) is a dead end bore. Its depth in the embodiment shown is 75% of the material thickness of the lower cover plate (111). Instead of a dead end bore (115), a through-bore may also be used.

The lightweight construction panel (100) may also be curved, that is, it may be of cylindrical or spherical shape, as long as the material thickness of the support core is at least approximately constant.

Figure 2:
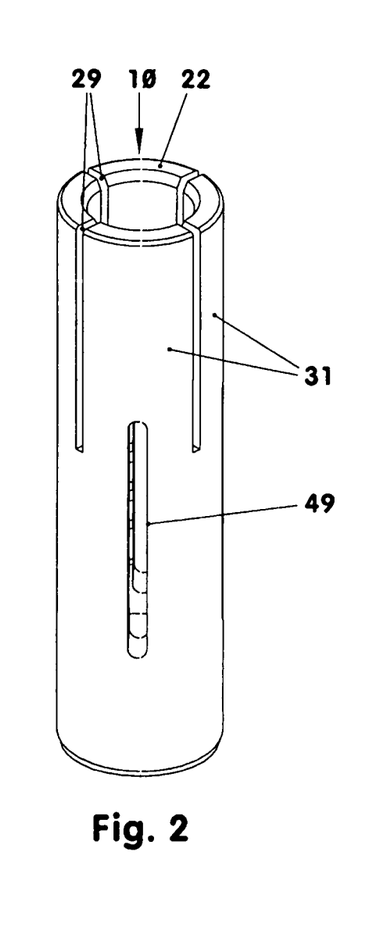
FIG. 2: An unspread expansion body of the anchor of FIG. 1.
Figure 4:
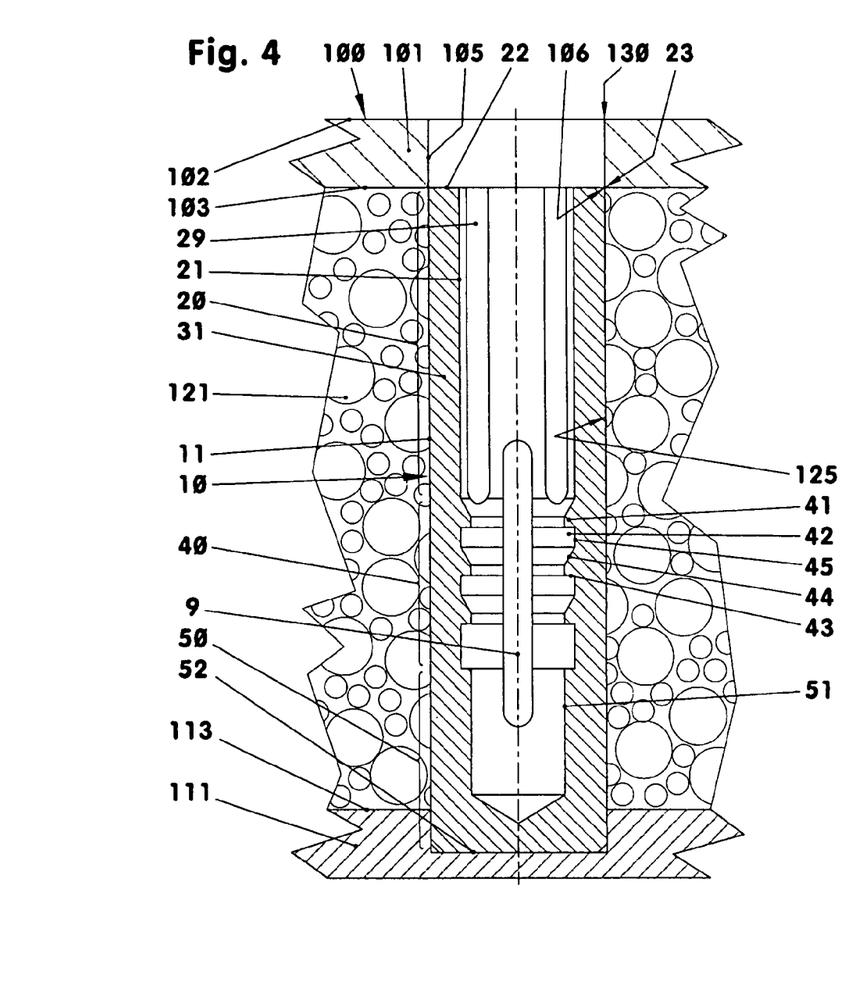
FIG. 4: An expansion body inserted into a light-weight building panel.

As shown in FIGS. 2 and 4, the upper area of the expansion section (10) which is for example cylindrical, has for example four straight longitudinal slots (29). The slots (29) however may also be spirally curved. They separate four locking elements (31) from one another. The length of the longitudinal slots (29) is for example 40 to 60% of the length of the expansion body. Their width is in the exemplary embodiment 0.5 mm and is constant over the full length of the anchor as long as it is not deformed. The longitudinal slots (29) have a 90° spacing. The longitudinal slots may also be spirally curved. They may end in radially arranged stress-relieving bores.

Figure 10:
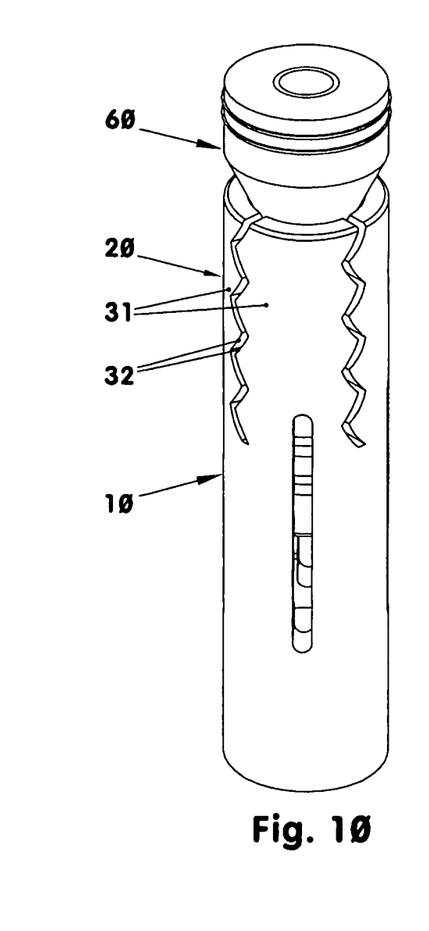
FIG. 10: Same as FIG. 1, but being provided with different longitudinal slots and the wedging body inserted.
Figure 11:
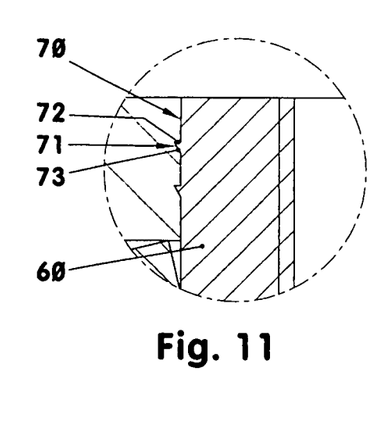
FIG. 11: An enlargement of a detail of FIG. 5.

FIG. 10 shows an expansion body (10) which is provided for example with a zigzag, meander-shaped or merlon-like longitudinal slot (29). Upon unintended rotation of the installed anchor in the area of the support core (121) by threading in of a screw, not shown, into the anchor—part of the locking flank sections (32) of the adjacent locking elements (31) come into contact with one another.

In the area of the locking elements (31), the inner wall (21) of the expansion body (10) has a cylindrical form.

At the upper end of the locking element (31) the expansion body (10) has a front face area (22) which in the present case is flat. Expediently, it may also have the shape of a flat truncated cone sleeve whose fictive tip is disposed on the center line (9) of the anchor above or below the upper expansion body end. In such a case, as cone angle, an angle of for example 156 angular degrees may be provided.

Since the expansion body (10) has a length which is equal to, or slightly smaller than, the shortest distance between the inner surfaces (103) of the cover plates (101, 111), the front face (22) is disposed, within the usual tolerances, in the plane of the inner surface (103) of the upper cover plate (101). According to FIG. 4, the outer edge (23) of the front face area (22) is disposed opposite the inner edge (106) of the bore (105). At its inner and outer edge the front face (22) is chamfered or rounded, see FIG. 2.

Below the locking elements (31), there is a locking zone (40) which consists for example of three engagement projections (41) and three engagement recesses (42) which are arranged alternately one behind the other. The individual annular support projection (41) which has several interruptions has a saw tooth-like cross-sectional shape. The engagement projection distance is about one fourth of the expansion body diameter.

The individual support projection (41) is provided with a slide flank (44) and a support flank (43). The support flank (43) which, in accordance with the FIGS. 4 to 7, is disposed always below the slide flank (44) of the same support projection (41) is part of a plane which extends normal to the center line (9). The slide flank (44) has the form of a truncated cone sleeve. The cone angle of the sleeve is for example 60 angular degrees, wherein the imaginary tip, which is disposed on the centerline (9), is always below the support flank (43) of the respective support projection (41).

The bottom (45) of the engagement grooves (42) has a diameter which corresponds to the diameter of the cylindrical inner wall (21) of the engagement section (20).

In the area of the locking zone (40), there are in this case four relief slots (49) which extend parallel to the anchor center line (9). They are arranged in each case opposite the longitudinal slots (29) displaced by 45 angular degrees. The relief slots (49) which are rounded at their ends may extend upwardly and downwardly 0.1 to 3 mm beyond the locking zone. The width of the relief slots (49) is twice the width of the longitudinal slots (29). In the shown embodiment, this is one millimeter.

Adjacent the locking zone (40) toward the bottom, there is the cylindrical bottom section (50). Its outer contour which extends around a dead end bore (51) ends with the lower end area (52). The dead end bore (51) has a diameter which corresponds to the minimum diameter of the support projection (41).

The expansion body 10 is disposed, together with the support section (50), in the dead end bore (115) with little or no radial play. The bottom end (52) of the expansion body (10) is in contact with the bottom wall (119) of the dead end bore (115), generally without any substantial play.

The bottom wall (52) of the expansion body (10) may be concavely curved or it may have another structure so that it abuts the surface (113) only along a line or certain points or over a partial area. The roughness depth of the structure is for example less than 0.5 mm.

Figure 7:
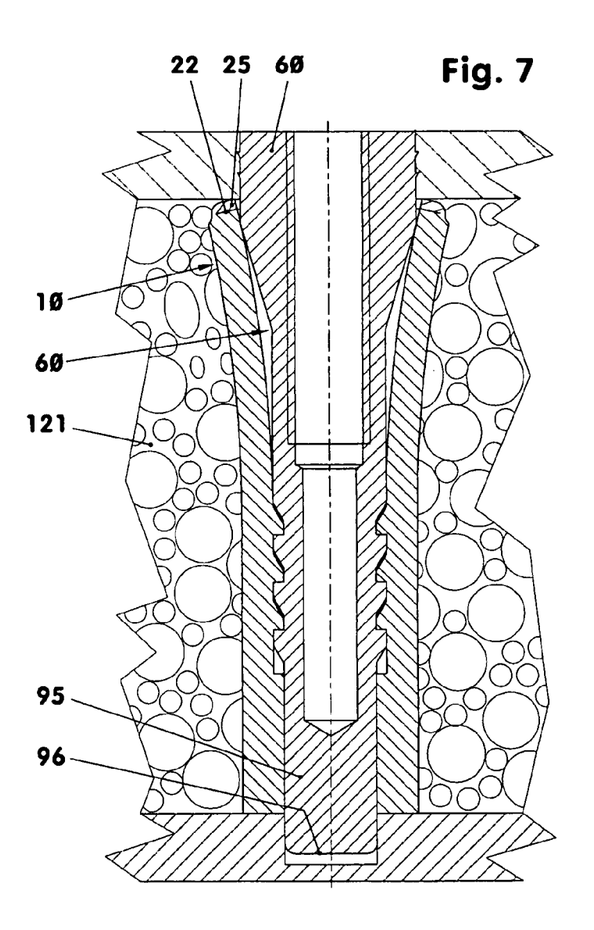
FIG. 7: The expansion body extending into the lower cover plate.
Figure 8:
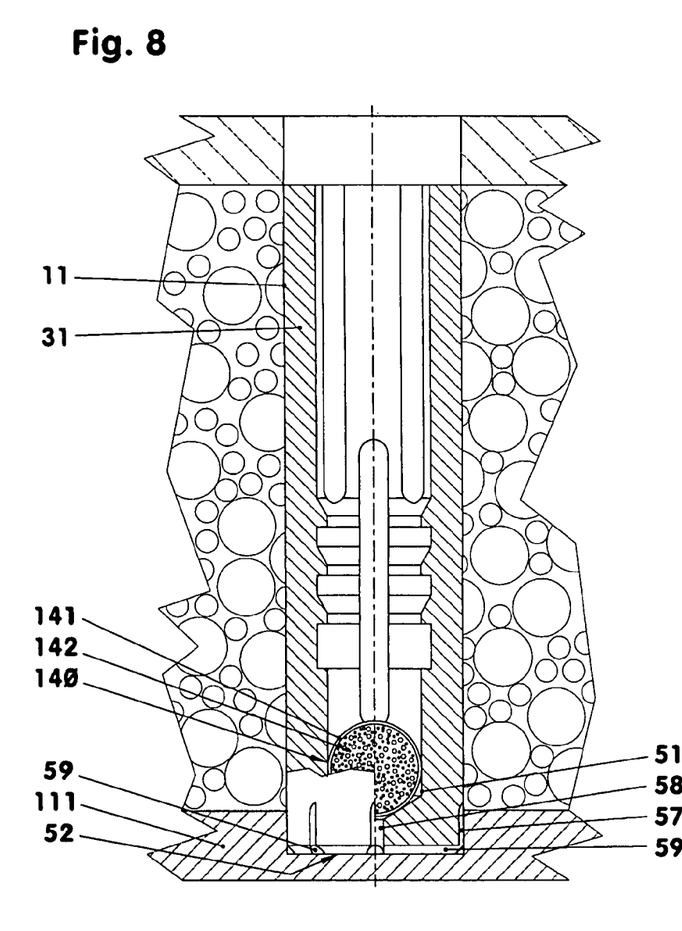
FIG. 8: The expansion body with a cement material balloon.
Figure 9:
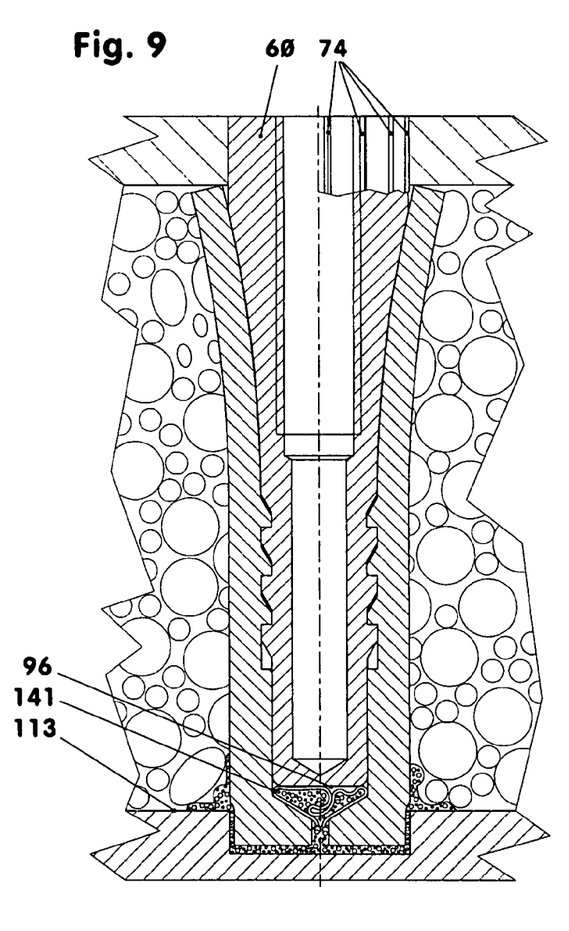
FIG. 9: The anchor with a wedging body installed into the expansion body according to FIG. 8.

Of course, the bottom wall (52) may also be omitted, see FIGS. 6 and 7, if the detail structure as shown in FIGS. 8 and 9 is not used, see below.

Figure 3:
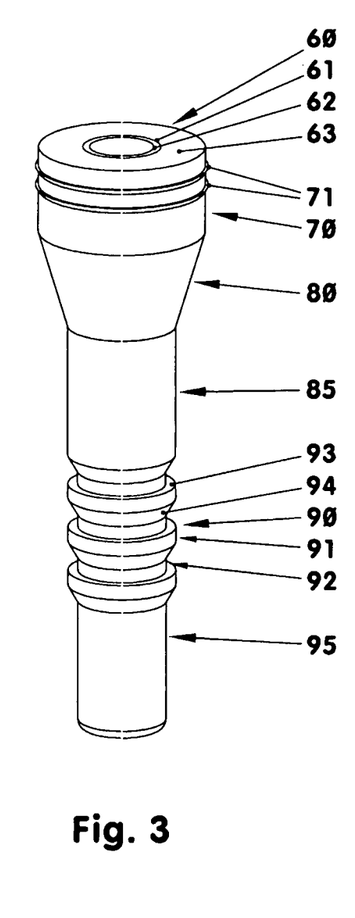
FIG. 3: The wedging body of FIG. 1.
Figure 5:
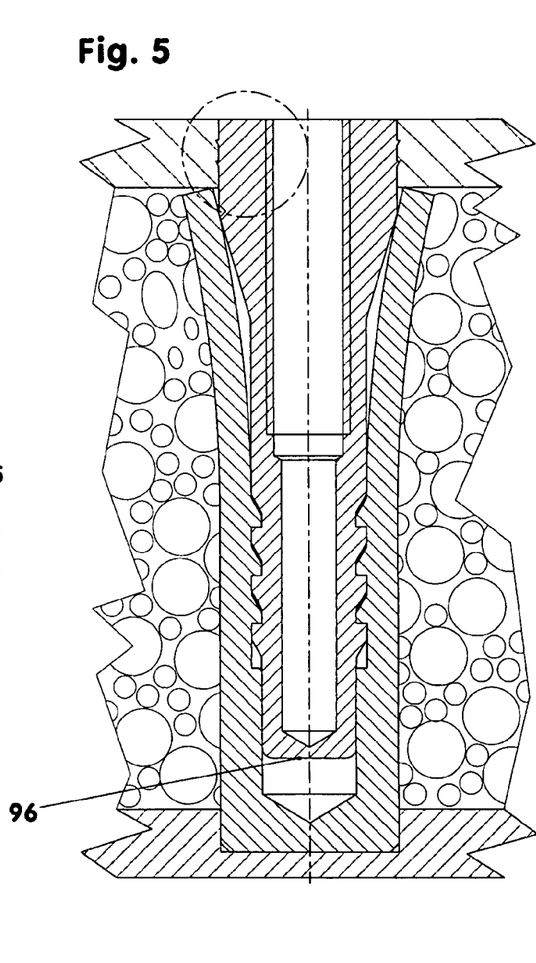
FIG. 5: An anchor mounted with the expansion body of FIG. 4.

FIG. 3 shows a wedging body (60), see also FIGS. 5 and 9. The wedging bodies shown herein are rotational symmetrical component, at least over parts thereof. They include here four sections: a seating section forming a cylindrical zone (70), a spreading section (85), a locking section (90) and a bottom end section (95).

The wedge body (60) has a central bore (61) with, for example, a metric internal thread (62). The internal thread (62) of the bore (61) ends in the shown embodiments shortly ahead of the locking zone (90). Alternatively, the bore (61) may have a rectangular, oval, polygonal or star-like cross-section for accommodating non-metric screws such as particle board screws or wood screws. The bar or cavity cross-section may become smaller from the bore beginning to the bore end.

The seating section (70) of the wedge body (60) has an essentially cylindrical outer contour, see FIG. 3. This section (70) is disposed in connection with an anchor installed in a lightweight building panel (100) in the bore (105) of the upper cover plate (101) possibly with a press-fit. According to FIGS. 5 and 7 one fourth to one third of the length of the seating section (70) extends additionally into the area of the support core (121). The purely cylindrical part of the seating section (70), the cylinder zone, has here an outer diameter which corresponds to the inner diameter of the bore (105). In FIG. 3, the seating section (70) has two circumferential retaining hook webs (71). The closed, annular retaining webs (71) have each a triangular cross-section, see FIGS. 5 and 9 with a support flank (72) and a slide flank (73). They project for example 0.15 mm over the respective cylindrical outer contour. The cause, among others, is a clamping of the wedge body (60) in the bore (105) which prevents rotation of the wedge body (60) in the bore (105). Additionally, the retaining hook webs seal the installation gap between the wedge body (60) and the light-weight construction panel (100), so that neither dirt nor moisture can enter. Also, in this way, no support core material can reach the ambient.

Alternatively, the seating section (70) may include a plurality of longitudinal webs (74), see FIG. 7. In the present case, it has 15 longitudinal webs (74). All webs extend parallel to the centerline (9) of the anchor. Also, in this case, each web (74) has a triangular cross-section, wherein its flanks enclose for example an angle of 90° degree. Expediently, the cross-sections of the webs (74) increase from top to bottom. This increases the tightness of the mounting gap.

The seating section (70) is followed by the wedging zone. The latter comprises a truncated cone whose fictive tip is arranged in the zone below (85) or (90) on the centerline (9). The acute angle is between 30 and 45 angular degrees. In the embodiment shown, it is 33.4°. The minimum outer diameter of the wedging zone (80) corresponds to the inner diameter of the undeformed engagement section (20) of the expansion body (10).

In the embodiment shown, the wedging zone (80) is followed by a cylindrical intermediate section (85) and the locking zone (90). At least the end of the intermediate section (85) adjacent the locking zone (90) has the same outer diameter as the inner diameter of the undeformed engagement section (20). Independently of the representations of FIGS. 1 to 10, the wedging zone (80) and the intermediate section (85) can be combined to a rotationally symmetrical wedging section wherein the cross-sections of this new wedging section increases continuously from the locking zone (90) to the cylinder zone (70) and, at least in some areas, in a non-linear manner, see FIG. 7. There, the locking elements (31) are engaged by the wedging body (60) at least over some part thereof.

The locking zone (90) of the wedge body (60) is in its design similar to the locking zone (40) of the expansion body (10). From top to bottom, there are three adjacent locking projections (91) of a locking groove (92), see FIG. 3. The spacing and the profile shape are known from the earlier described locking zone (40). Also, in this case, the locking projections (91) have each a planar support flank (93). However, the support flank is provided on top of each locking projection (94).

As shown in the figures, locking occurs exclusively in the separate locking zones (40, 90). But it is also possible to arrange the locking zones partially or completely in the wedging zone (80), or, respectively, the area of the engagement elements (31).

Adjacent the locking zone (90), there is a cylindrical bottom end section (95). It ends with a bottom wall (96), see FIG. 5. The outer diameter of the bottom end section (95) corresponds to the minimum groove bottom diameter of the engagement grooves (92).

The expansion body (10) and the wedge body (60) consist for example of a polyamide.

To facilitate mounting of the anchor, an opening is drilled through the first cover plate (101) and the support body (121). The opening is also drilled to a depth of 2.5 mm into the second cover plate (111) which in the shown embodiment has a thickness of four millimeter. As drilling tool for example a spiral drill is used, which has a tip angle of 180 angular degrees. Also, a front face cutter tool may be used. Depending on the type of anchor, the opening (130) may also be drilled by a stepped face cutter for example if the dead end bore (115) in the lower cover plate (111) is to have a smaller diameter than the rest of the opening (105, 125), see FIGS. 6 and 7.

The dead end bore (115) may have an internal contour which is truncated cone-shaped rather than cylindrical. The support zone (50) then has a correspondingly adapted outer contour. Furthermore, instead of a circular cross-section, the dead end bore may have a rectangular, triangular or polygonal cross-section if a suitable manufacturing method is available. Furthermore, it is not necessary that the support zone fits snugly—in shape—into the dead end bore. The outer contour of the support zone (50) may for example have an outer shape of the support zone (50) with longitudinal grooves via which it is firmly and non-rotatably clamped in the cavity 115 without any play.

The cavity or, respectively, bore (130) is blown out for example by compressed air or is sucked out.

According to FIGS. 4 and 8, the expansion body (10) is inserted into the empty bore (130) over the full length so that it abuts the bottom (119) of the dead end bore (115) of the lower cover plate (111) and its front end face (22) is disposed on the level of the inner surface (103) of the upper cover plate (101). The expansion body (10) is disposed for example with the use of foamed support cores in the bore (125) only with little play.

Upon installation of the wedge body (60) into the bore (21, 51) of the expansion body (10) the wedging zone (80) of the wedge body (60) presses the locking elements (31) of the expansion body (10) elastically apart, so that they extend behind the inner surface (103) of the first, upper cover plate (101). The front face area (22) may be so designed, that it abuts with the whole face area thereof the surface (103) thereof, the inner surface (103) of the cover plate (101). At the same time, the cylinder zone or, seating section (70) of the wedge body (60) is pressed into the bore section (105). The cylinder zone (70) is disposed in the bore section (105) with a residual radial engagement bore and, at its end, is disposed planar with the outer surface (102) of the first cover plate (101). The upper planar front end face (63) of the wedge body (60) is disposed one to three tenths of a millimeter below the outer surface (102) of the cover plate (101).

At the end of the expansion movement of the locking elements (31), the engagement projections (91) of the wedge body (60) engage into the locking grooves (42) of the expansion body (10) in an unreleasable manner. During the three locking steps occurring in the process, the expansion body (10) is expanded three times for a short time. The release slots (49) are temporarily elastically widened in the process. After completion of the locking process, the expansion body (10) assumes in the area of the locking zone again its cylindrical contour (11). A fixture, for example, to be mounted can now be attached by a screw screwed into the bore (61) of the wedge body (60).

In the manufacture of wooden furniture, the attachment strength of a fixture does not only depend on the pull-out resistance of the screws disposed in the anchors but also in the limiting of setting amounts and in the avoidance of looseness in the direction transverse to the center line of the respective screw. The anchor presented herein is retained in a direction transverse to the anchor center line (9) on one hand, via the cylinder zone (70) in the bore (105) of the first cover plate (101) and, on the other hand, its support zone (50) is also disposed in the second cover plate (111). In this way, the anchor center line (9) is oriented in a form-locking manner normal to the outer surface (102) of the cover plate (101). Since in addition, the anchor is, by design, not bendable, the screws disposed in the anchor do not tend to tilt which could result in an accelerated loosening of the connection. As a result, the chances of an unintended loosening or releasing of the fixture is minimized or even prevented.

In the shown embodiments, the wedge body is, at least as far as its outer contour is concerned, at least to a large extent, a rotational symmetrical body. Alternatively, however, its various cross-sections or at least part thereof may have square, polygonal oval or otherwise profiled crosssections. The wedge body (60) together with the expansion body (10) may be interconnected in the locking zone for example by a thread so that the wedge body is not installed in a linear, non-rotating movement, but by a screw-in movement.

With the use of a thread in the mounting gap between the expansion body (10) and the wedge body (60), a locking or blocking device is arranged so that the expansion body (60) can no longer be turned out or only with large effort.

In place of the form- and/or force-locking connection between the expansion body and the wedging body by means of locking zones or a thread also a bayonet locking structure may be provided. The connection by means of a thread or a bayonet locking structure is considered to be equally effective as far as the locking zones are concerned.

Figure 6:
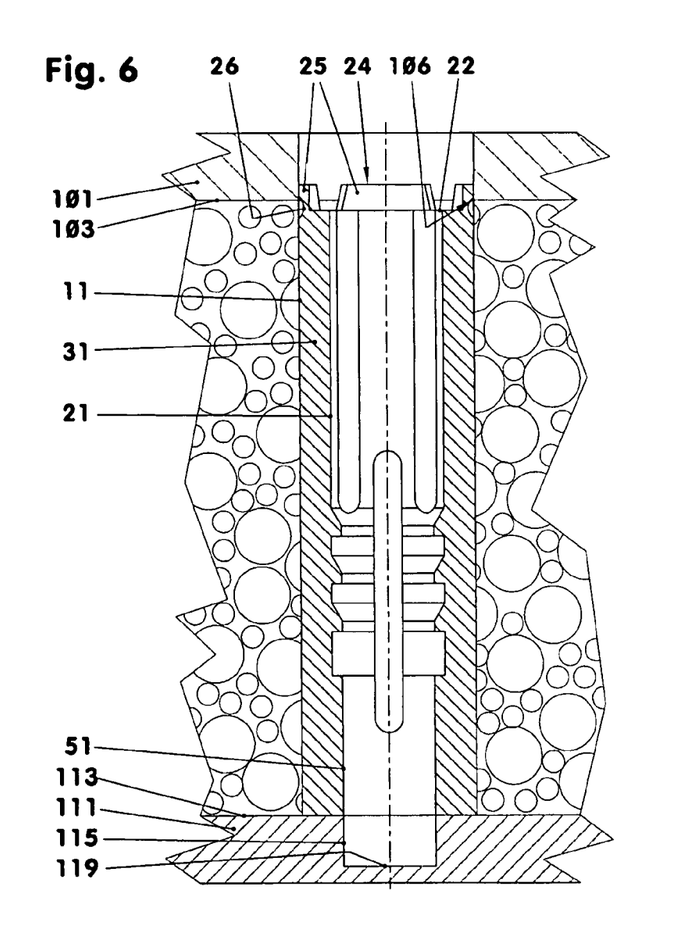
FIG. 6: The expansion body abutting the lower cover plate.

The FIGS. 6 and 7, as well as 8 and 9, show two additional detail solutions. The first detail solution concerns an anchor wherein not only the support body (10), but the wedging body (60) is supported in the dead end bore (115) of the lower core support plate (111). The dead end bore (115) has in this case only the diameter of the support zone (50). As a result, the, in this case, tubular expansion body (10) has a length corresponding to the material thickness of the support core (121).

After the setting of the expansion body (10), the wedging body (60) is pressed into the bores (21, 51). In this process, the support zone (50) enters the dead end bore (115). The support zone (50) has to come into contact with the bottom (52), not the bottom (96) of the bore (115).

During the installation of the anchor in a honeycomb plate there is the possibility that the expansion body (10) is displaced sidewardly after introduction into the support structure before the wedging body (60) is pressed into the expansion body (10) in a centering manner.

To prevent sideward displacement, the upper front face of the expansion body (10) is provided with a different shape. On the front (22), a pinnacle-like, thin-walled rim (24) consisting of rim segments (24) is provided which extends the outer contour (11) of the expansion body to such an extent that the outer edge (23) of the rim (24) is disposed above the inner surface (103) of the cover plate (101) as shown in FIG. 6. Each engagement element (31) is provided consequently with at least one rim segment (25). The rim segments (25) are sidewardly fased.

In the transition area between the engagement elements (31) and the rim segments (25), the outer contour (11) is provided with a circumferential groove (26) interrupted by the longitudinal slots (29) so as to form a film joint. In accordance with FIG. 6, the vertical center line of the groove (26) is slightly below the plane of the inner surface (103) of the cover plate (101).

When now the wedge body (60) is driven into the expansion body (10), the engagement elements are pushed outwardly whereby the rim segments (25)—abutting the bore edge (106)—are bent and folded onto the front face (22), see FIG. 7. Together with the folded rim segments (25) the expansion body (10) now has the length necessary to fit between the cover plates (101, 111).

In the embodiment according to FIGS. 6 and 7, a second possible expansion procedure, which is not shown, may be realized. To this end, the foot end section (50) is provided with four longitudinal slots extending from the bottom end. The longitudinal slots are spaced for example 90° and may be arranged aligned with the grooves (29). They separate four additional engagement elements which are firmly engaged in the intermediate support core upon installation of the anchor. This additionally increases the anchor retaining force. To this end, at the bottom end section (50), the cylindrical bore (51) is provided with an inner contour in the form of a truncated cone, which becomes smaller toward the bottom end. When the wedge body (60) is inserted, the foot end section (95) pushes the spreading elements (54) outwardly.

The second detail solution makes an additional fixing of the anchor on the lower cover plate (111) by cementing possible. To this end, the expansion body (10) of the anchor is provided with a cement material cartridge or, respectively, balloon (140). The cement material balloon (140) is for example ball or barrel-shaped and is disposed in the lower end of the dead end bore (51). The cement material balloon (140) consists for example of a thin-walled membrane (141) which encloses a cement material (142) in a durable manner so that it will not dry up. Expediently, the membrane (141) includes two chambers so that it can store two different cement components separated from each other.

In accordance with FIGS. 8 and 9, the bottom end (52) has for example eight radial grooves (59) which extend from an axial bore (58) in the center of the bottom end to the outer wall (11) of the expansion body (10). There, they meet with the longitudinal grooves (57) which have a length that is less, or equal to, the wall thickness of the lower cover plate (111).

When now the wedge body (60) is pressed into the expansion body (10), see FIG. 9, the cement material balloon (140) is compressed between the bottom walls (96) and (52) such that it fractures. For assisting the desired fracturing effect, the cement balloon (140) may have a weak part designed to fracture when desired. It is also possible to arrange a puncturing or ripping device at one of the bottom walls (52, 96). A combination of weak area and fracturing device is also possible.

The cement material (142) discharged from the cement material balloon (140) is pressed by the advancement of the wedge body (60)—acting as a piston—through the bore (58) into the grooves (59). From there the cement material (142) is distributed between the bottom (52) and the inner surface (113) of the lower cover plate (111) and also in the area of the wall of the dead end bore (115). The excess cement (142) envelops additionally the lower area of the outer contour (11) of the expansion body (10).

By the cementing of the expansion body (10) or, respectively, the anchor to the lower cover plate (111) the latter assumes part of the load effective on the anchor.

Figure 13:
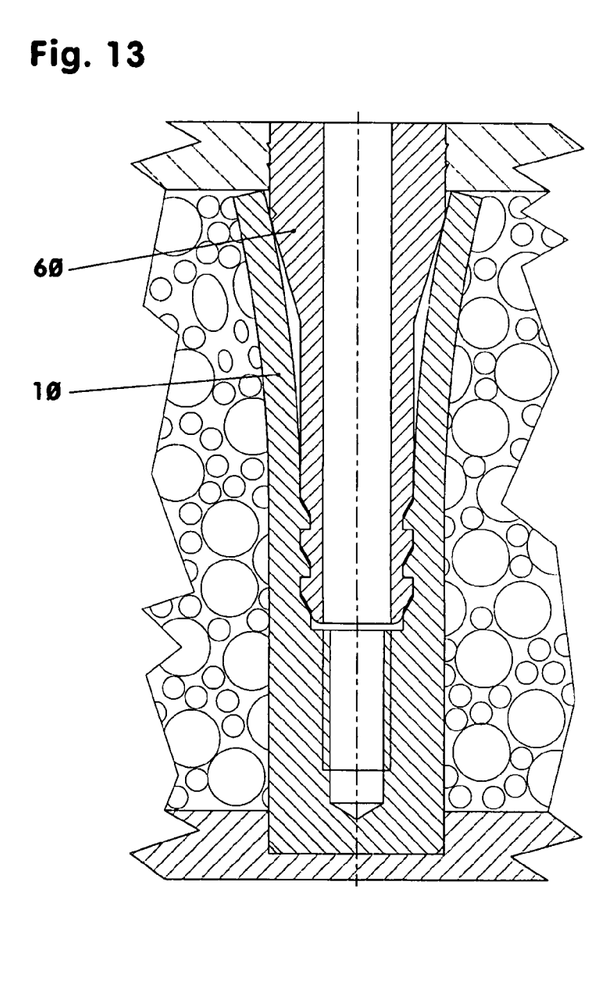
FIG. 13: The anchor with a different screw-in arrangement.
Figure 14:
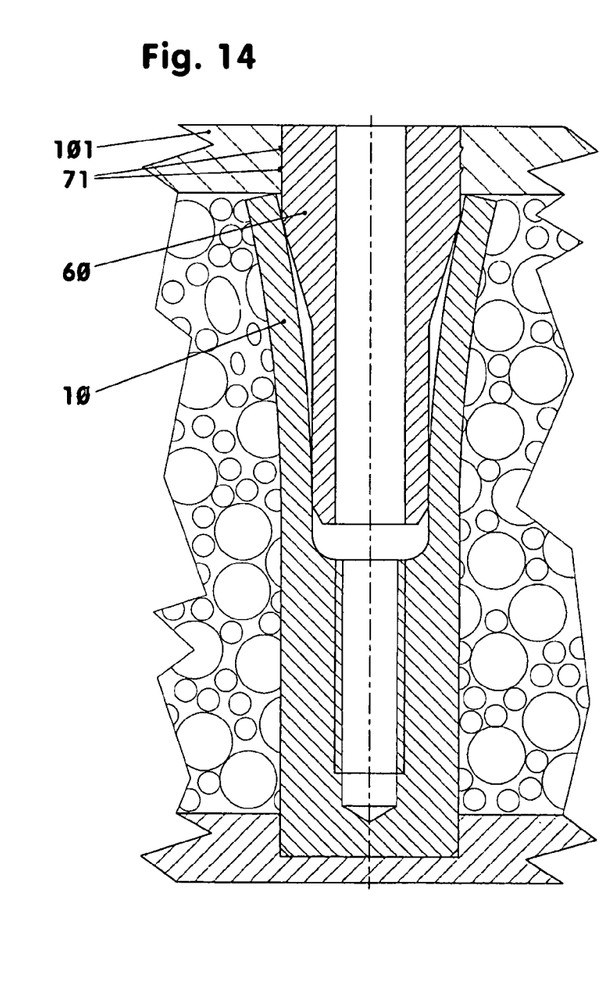
FIG. 14: The anchor without locking structure.

In the FIGS. 13 and 14, two different anchors are shown wherein the cementing material is not contained in the wedging body (60), but is screwed into the expansion body (10). In accordance with FIG. 13, the wedging body is non-releasably locked into the expansion body.

In the anchor according to FIG. 14, no locking structure is provided. The wedging body (60) is retained in the cover plate (101), among others, by the barb webs (17).

Figure 15:
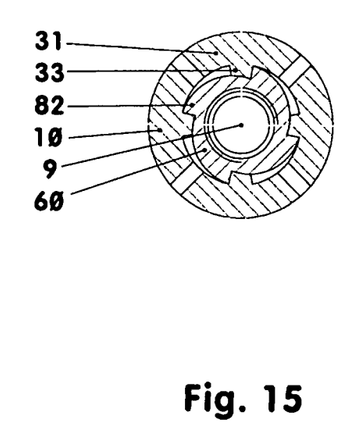
FIG. 15: A cross-section of an anchor with eccentric expansion in non-deformed state.
Figure 16:
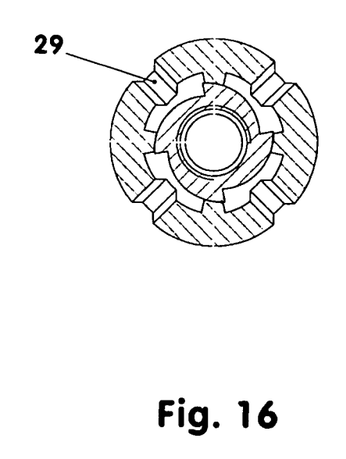
FIG. 16: Cross-section of an anchor with eccentric expansion in a deformed state.

The FIGS. 15 and 16 are cross-sectional views of an anchor wherein the wedge body (60) is arranged in the expansion body (60) already before the installation of the anchor in the expansion body (10). The anchor is consequently premounted installed in the bore (130). The two wedging zones of the wedge body (60) are in this case for example four eccentric elements (82) which, by rotation—about the longitudinal axis (9) of the anchor—expand the engagement elements (31) and expediently also the spreading elements (54) of the expansion body (10). In the process, the eccentric elements (82) slide along cams (33) which are formed onto the engagement elements (31).

The rotational movement of the wedge body (60) in the expansion body (10) may be limited or arrested for example by engagement elements or stops. In the FIGS. 15 and 16 the engagement elements and/or stops are disposed in another sectional plane which is not visible here.

Of course, the anchoring principle is not limited to anchors with at least partially cylindrical outer contour. The anchor may also be designed for example for a cavity which has an at least partially elongated or oval cross-section.

LISTING OF REFERENCE NUMERALS

9 Center line of the anchor
10 Expansion body
11 Outer wall, cylindrical contour
20 Engagement section
21 Inner wall, bore
22 Front face area
23 Outer edge
24 Rim
25 Rim segment
26 Groove
29 Longitudinal slots
31 Engagement elements, spreading elements
32 Engagement flank sections
33 Cam
40 Locking zone
41 Support projection
42 Engagement recesses, support grooves
43 Support flanks
44 Slide flanks
45 Groove bottom
49 Relief slots
50 Foot section, support zone
51 Dead end bores, chamber
52 Bottom
57 Longitudinal grooves
58 Axial bore, cavity
59 Radial grooves
60 Wedge body
61 Central bore
62 Internal thread
63 Front face, top
70 Seating section, cylinder zone
71 Barbed webs, circumferential webs, surface structure
72 Support flank
73 Slide flank
74 Longitudinal webs, surface structure
80 Spreading section, wedging zone
82 Eccentric elements
85 Intermediate section
90 Locking zone
91 Engagement projection
92 Engagement recesses, engagement grooves
93 Support flank, planar
94 Slide flank
95 Bottom end section, piston like end
96 Bottom
100 Sandwich panel lightweight composite panel, planar construction component with support core
101 Upper cover plate
102 Outer surface
103 Inner surface
105 Bore
106 Inner edge
111 Lower cover plate
113 Inner surface
115 Dead end bore, dead end cavity
119 Bottom of dead end bore (or cavity)
121 Support core, honeycomb core, foamed material core
125 Bore
130 Overall bore, cavity
140 Cement material cartridge, cement material balloon
141 Membrane
142 Cement material

What is claimed is:

1. An anchor for mounting in planar building panels (100) which are manufactured with a support core having a first cover plate (101) and a second cover plate (111) and at least one intermediate support core layer (121), the anchor including an expansion body (10) and a wedge body (60), the wedge body (60) being at least partially inserted into the expansion body (10) and including an opening for screwing in or pounding in a mounting means, wherein
the installed anchor is disposed in an opening (130) of the building panel (100) which opening extends through the first cover plate (101) and the intermediate support core layer (121), and partially into the second cover plate (111) to form in the second cover plate a dead end bore (115),
the expansion body (10) includes at least two spreadable locking elements (31), an inner locking zone (40) and, at the bottom end of the expansion body (10), a support zone (50),
the wedge body (60) has a cylindrical zone (70), a wedging zone (80), an outer locking zone (90) and a threaded bore (61),
and, with the anchor disposed in place in the building panel (160), the cylinder zone (70) abuts in a bore section (105) of the opening (130) the first cover plate (101), the wedging zone (80) spreads apart the locking elements (31) of the expansion body (10) behind the first cover plate (101) whereby the locking elements (31) abut the first cover plate (101) so that the locking zones (40, 90) are locked together, and the support zone (50) of the expansion body (10) extends into the dead end bore and abuts in the dead end bore of the second cover plate (111) of the wall of the dead end bore (115) at least radially.

2. The anchor according to claim 1, wherein the support zone (50) of the expansion body (10) extending into the dead end bore (115) of the second cover plate (111) has a length which is 50 to 80% of the wall thickness of the cover plate.

3. The anchor according to claim 1, wherein the expansion body (10) has a tubular shape.

4. The anchor according to claim 1, wherein the expansion body (10) is provided, at least in some areas, with longitudinal slots for forming the locking elements (31).

5. The anchor according to claim 1, wherein the wedging zone (80) of the wedge body (60) has a circular, a square, a polygonal or a star-shaped cross-section.

6. The anchor, according to claim 1, wherein, with the anchor installed, a cylinder zone (70) of the wedge body (60) abuts the first cover plate (101) at least in some areas without play.

7. The anchor according to claim 1, wherein, with the anchor installed, the cylinder zone (70) of the wedge body (60) disposed in the bore (105) is provided with a structured surface (71, 74) to prevent rotation of the anchor.

8. The anchor according to claim 1, wherein the locking zones (40, 90) of the expansion body (10) and the wedge body (60) each are provided with a saw tooth profile.

9. An anchor for the attachment on flat construction panels (100) manufactured in a support core design, comprising first and second cover plates (101, 111) an intermediate support core layer (121), the anchor comprising an expansion body (10), a wedge body (60) which is at least partially inserted into the expansion body (10) and includes an opening for screwing in or pounding in a mounting means, wherein the installed anchor is disposed in an opening (130) of the building panel (100) which extends through the first cover plate (101) and the intermediate support core layer (121) and partially into the second cover plate (111) so as to form in the second cover plate (111) a dead-end bore (105), the expansion body (10) has at least two spreadable engagement elements (31) and an inner locking zone (40), the wedge body (60) includes a cylinder zone (70), a wedging zone (60), an outer locking zone (90) and a support zone (95), and, with the anchor installed, the cylinder zone (70) of the wedge body (60) abuts the wall of the dead end bore (105) in the first cover plate (101), the wedging zone (80) spreads the engagement elements (31) of the expansion body (10) apart behind the first cover plate (101) so as to abut the first cover plate, the inner and outer locking zones (40, 90) are interlocked, and the support zone (95) of the wedge body (60) abuts in the dead end bore (115) of the second cover plate (111) the walls thereof axially and radially.

10. An anchor for installation in flat building components (100) comprising first and second cover plates (100, 101) and an intermediate support core layer (121), the anchor including at least one expansion body (10) and at least one wedge body (60) which is at least partially inserted into the expansion body (10) and has an opening accommodating a mounting means for the screwing in, or pounding in, of the mounting means, wherein the anchor, when installed in the building component (100), is disposed in a cavity (130) of the building component (100) which cavity extends through the first cover plate (101) and the intermediate support core layer (121) and also partially into the second cover plate (111) so as to form therein a dead end bore (115), the expansion body (10) has at least two spreadable engagement elements (31), and a support zone (50), the wedge body (60) has a cylinder zone (70) and wedging zone (80), and with the anchor installed, the cylinder zone (70) abuts the wall of the bore (105) of the first cover plate (101), the wedging zone (80) spreads apart the engagement elements (31) of the expansion body (10) behind the first cover plate (101) so as to abut the backside of the first cover plate (101) and the support zone (50) of the expansion body (10) abuts the dead end bore (115) walls of the second cover plate (111) axially and radially.

11. The anchor installation according to claim 10, wherein the expansion body (10) has a chamber (51) with a cement material (142) containing cartridge (140) and is provided with discharge openings (58), and the bottom end (52) of tile expansion body (10) extends into the dead end bore of the second cover plate (111) with the cement material (142) of the opened cement material cartridge (140) being distributed in the area between the second cover plate (111) and the bottom end (52) of the expansion body (10).

12. The anchor according to claim 11, wherein the bottom end (52) of the expansion body (10) includes grooves (59) for the distribution of the cement material (142).

* * * * *